T. P. BARTON.
SHOVEL.
APPLICATION FILED JULY 1, 1916.
1,207,472.
Patented Dec. 5, 1916.
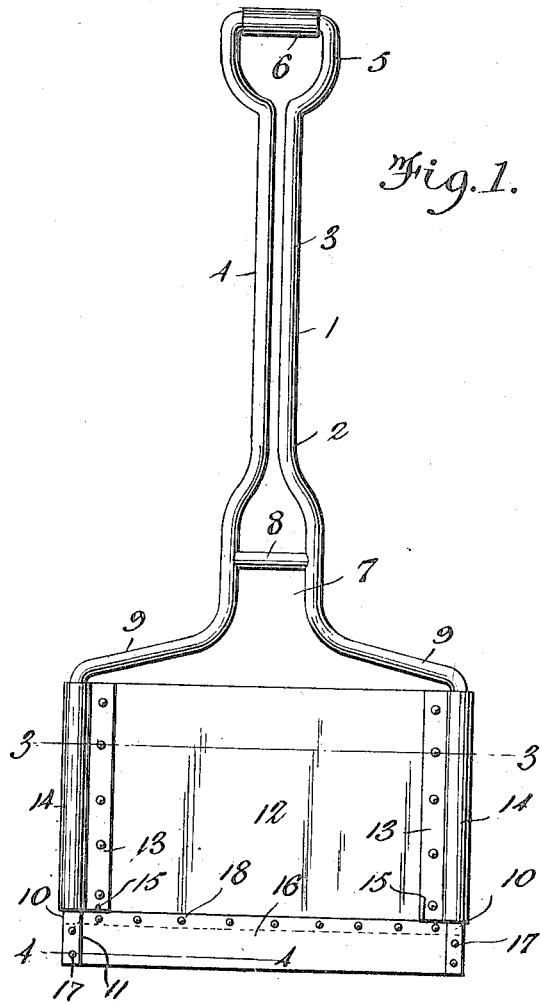
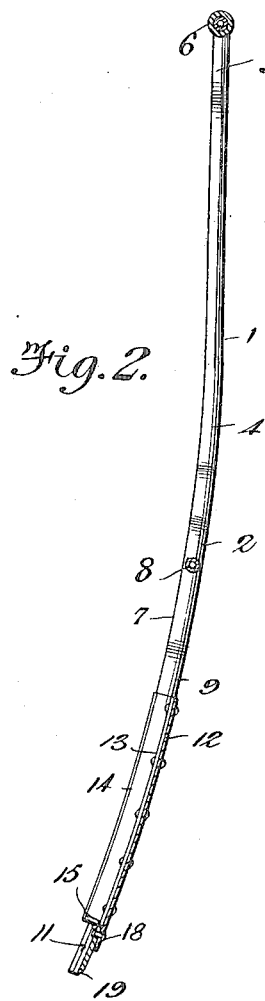
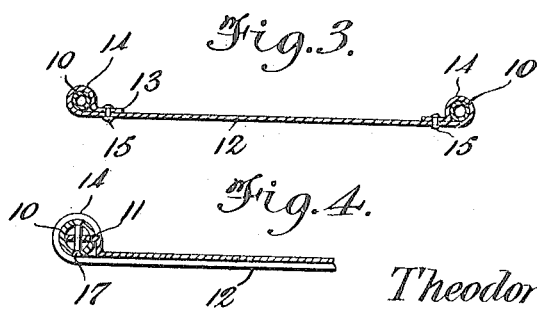
Witness
Fredrick W. Ely
Inventor
Theodore P. Barton.
By Victor J. Evans
Attorney

UNITED STATES PATENT OFFICE.

THEODORE P. BARTON, OF KEENE, NEW HAMPSHIRE.

SHOVEL.

1,207,472.  Specification of Letters Patent.  Patented Dec. 5, 1916.

Application filed July 1, 1916.  Serial No. 107,106.

*To all whom it may concern:*

Be it known that I, THEODORE P. BARTON, a citizen of the United States, residing at Keene, in the county of Cheshire and State of New Hampshire, have invented new and useful Improvements in Shovels, of which the following is a specification.

This invention relates to a shovel and more particularly to a shovel which is especially adapted for use in removing ice or snow.

The primary object of the invention is to provide a shovel of the class described which may be constructed entirely of metal to render the shovel extremely strong and serviceable although the construction of the shovel is such that the weight of the same is materially decreased.

Another object of the invention is to provide a shovel for the purpose set forth in which a shovel frame formed from steel tubing is provided with offset portions therein terminating in spaced arms received in sleeves on a metal plate arranged between the arms and forming the scoop portion of the shovel.

A further object of the invention is to provide a shovel in which the spaced arms on the shovel frame which are received in the sleeve of the shovel blade are slit for a portion of their length to receive the ends on a bar connected with the shovel blade and having a cutting edge arranged in advance of the same.

With these and other objects in view, the invention resides in the novel combination and arrangement of parts, which will be hereinafter described and particularly pointed out in the claim.

The preferred embodiment of the invention has been illustrated in the accompanying drawing, although no restriction is necessarily made to the precise details of construction therein shown, as changes, alterations, and modifications, within the scope of the claim may be resorted to when desired.

Like characters of reference denote corresponding parts throughout the several views in the drawing, in which:

Figure 1 is a view in elevation of a shovel constructed in accordance with the invention. Fig. 2 is a vertical longitudinal sectional view through the shovel. Fig. 3 is a horizontal transverse sectional view on the line 3—3 of Fig. 1. Fig. 4 is a horizontal transverse sectional view on the line 4—4 of Fig. 1.

Referring now to the drawing in detail, the numeral 1 designates the improved shovel having a shovel frame 2 which is formed from a single length of steel tubing folded upon itself between its ends to form shank members 3 and 4 terminating at one end in a handle loop 5 arranged at right-angles to the shank members and provided with a sleeve 6 forming a hand grip.

The shank members 3 and 4 are spaced apart as at 7, for a portion of their length and receive therebetween a base bar 8 terminally connected with the spaced portions of the shank members and providing the shovel frame with an auxiliary handle.

The spaced portions of the shank members 3 and 4 which extend beyond the bar 8 terminate in oppositely extending offset portions 9 arranged at right-angles to the shank members and terminating in spaced arms 10 lying in a plane parallel with the shank members 3 and 4 and with each arm 10 provided with a slit 11 which extends longitudinally of the arm for a portion of its length and opens out through the free end of the arm.

A plate of metal 12, such as galvanized iron, or the like, and which forms the blade of the shovel is provided at each end with an extension 13, said extensions being folded upon the plate and secured thereto to provide transversely extending sleeves 14 in which the arms 10 are received to enable the body of the plate 13 to extend between said arms and co-act therewith in forming the scoop portion of the shovel, said plate and sleeves being curved transversely throughout their length to correspond to the curvature of the shovel frame 1 at its lower end.

The portions of the extensions 13 which are secured to the plate 12 are so arranged that the lower ends thereof form abutments 15 on the shovel blade which are disposed adjacent the inner ends of the slits 11 in the arms 10.

A bar 16 extends transversely between the arms 10 in advance of the plate or blade 12 and has its ends extended into the arms 10 through the slits 11 therein and secured to the arms 10 by rivets 17, said bar overlapping the portion of the plate 12 which extends beyond the sleeves 14 and is secured to said extending portion of the blade by rivets 18 which pass through the blade and bar and hold one side edge of the bar in contact with the abutments 15 provided by the extensions 13.

The bar 16 has one side edge beveled to provide a cutting edge 19 which enables caked ice or snow to be more easily loosened from a surface when the shovel is in use.

From the above described manner of connecting the blade or plate 12 with the arms 10 which receive therein the ends on the bar 16, it will be seen that the extensions 13 and arms 10 firmly brace the bar 16 so that when the shovel is in use and the bar is used to loosen caked ice or snow, the bar will not be loosened from its connection with the shovel blade 12 and that through the provision of the brace bar 8 which serves as an auxiliary handle, the shovel may be successfully used as a chopping instrument for loosening ice and the like from the surface which is to be cleaned by the shovel.

From the foregoing statements, taken in connection with the accompanying drawing, it is at once apparent that a shovel has been provided which is extremely strong and durable in use although the weight of the shovel has been reduced to a minimum.

Having thus described the invention, what is claimed as new, is:

A shovel comprising a length of tubing folded upon itself between its ends to provide a shovel frame having spaced parallel sides terminating at one end in a handle loop, offset portions between the ends of the sides forming spaced arms on the shovel frame having slits therein, a blade having extensions forming sleeves thereon and receiving said arms above said slits, a plate secured to said blade and extending beyond the same, said plate having a cutting edge thereon, and ends on said plate received in said slits and connected with said arms.

In testimony whereof I affix my signature.

THEODORE P. BARTON.

Copies of this patent may be obtained for five cents each, by addressing the "Commissioner of Patents, Washington, D. C."